No. 732,728. PATENTED JULY 7, 1903.
J. B. FORSYTH.
RUBBER ROLL.
APPLICATION FILED NOV. 22, 1902.
NO MODEL.
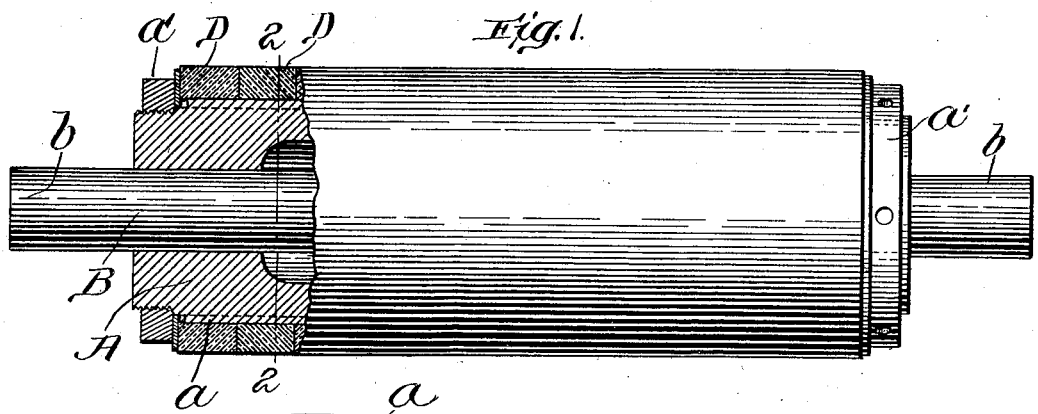
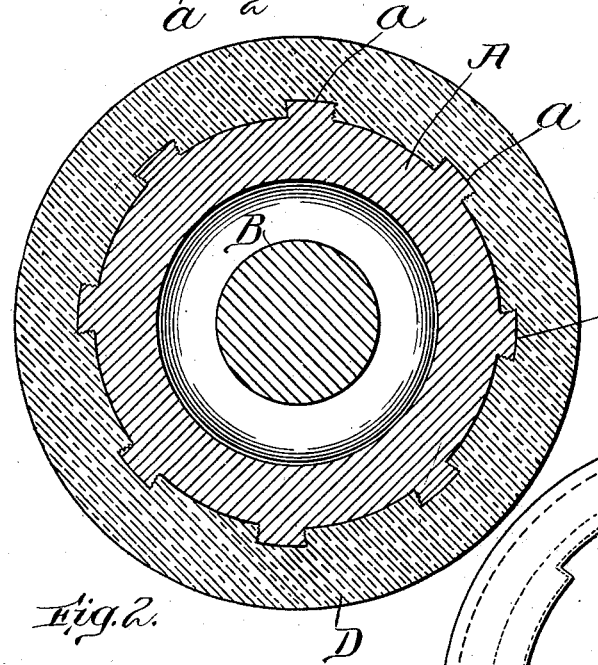
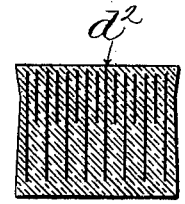
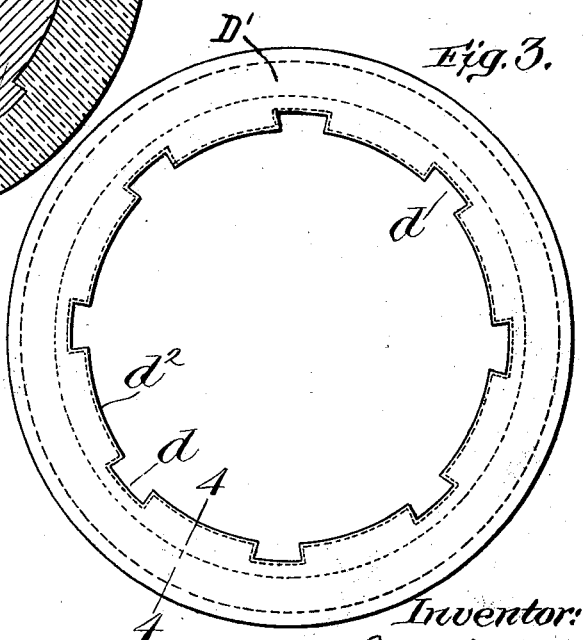
Witnesses:
Inventor:
James Bennett Forsyth,
by Maynadier & Rockwell,
Attorneys.

No. 732,728. Patented July 7, 1903.

UNITED STATES PATENT OFFICE.

JAMES BENNETT FORSYTH, OF BOSTON, MASSACHUSETTS.

RUBBER ROLL.

SPECIFICATION forming part of Letters Patent No. 732,728, dated July 7, 1903.

Application filed November 22, 1902. Serial No. 132,409. (No model.)

*To all whom it may concern:*

Be it known that I, JAMES BENNETT FORSYTH, of Boston, in the county of Suffolk and State of Massachusetts, have invented a new and useful Rubber Roll, of which the following is a specification.

My invention relates to rubber rolls consisting of a core with suitable journals and a rubber covering made up of sectional rings compressed axially between end clamps on the core; and it consists, mainly, in rings of vulcanized rubber each made up independently of the core, each with an inner portion formed to fit projections fast to the core to prevent movement of the ring around the core or of the core axially within the ring, and each with that inner portion reinforced with sheets of duck or like textile fabric standing edgewise across the axis of the ring and enveloped in the vulcanized rubber which forms the body of the ring to prevent radial yielding of the inner portion of the ring with relation to the exterior of the core, as will now be more fully described with reference to the drawings, in which—

Figure 1 is an elevation, partly in section, of one form of my rubber roll adapted for heavy strains, such as in wool-washing, bleacheries, dye-works, and in general whenever rubber-covered rollers are required. Fig. 2 is a cross-section, on a larger scale than Fig. 1, on line 2 2 of Fig. 1. Fig. 3 is an elevation of a modified form of my rubber ring. Fig. 4 is a section on line 4 4 of Fig. 3, but on a larger scale than Fig. 3.

As shown in the drawings, the core A, having eight keys $a$, is secured to shaft B, whose ends $b$ form journals. Rings D, of rubber or the like, are molded with internal keyways $d$ to fit over core A, each ring being preferably short, so that it will take a plurality of the rings to cover the body of core A. The rings having been packed over core A, the nuts $a'$ are screwed up, clamping each ring to the next, as shown in Fig. 1, thereby compelling each ring to tightly hug the core and also compelling each keyway $d$ in each ring to tightly grip its key $a$, thus holding each ring D with relation to core A, so that the rings D constitute practically one mass, and preventing any movement of any portion of either ring D with relation to core A, except those movements due to the compressibility and resiliency of the outer or cushioning portions of rings D.

In the modified form shown in Figs. 3 and 4 the sectional rings D' have a finishing-coat $d^2$ at their inner surfaces, and the outer portion is rubber only. Next the outer portion is an intermediate portion composed of alternate layers of duck and rubber, and next the finishing-coat is an inner portion, likewise composed of alternate layers of duck and rubber, but having the layers of duck nearer together than in the intermediate portion, the layers of duck of the intermediate portion extending into and forming also layers of the inner portion, as clearly shown in Fig. 4. The inner portion is molded to fit the core and its projections $a$. Thus the inner portion of the ring D' when vulcanized is comparatively hard and the outer portion comparatively soft, while the intermediate portion is softer than the former and harder than the latter, this being a matter well known to all skilled in the art of compounding and vulcanizing rubber. The rings of duck also harden the inner portion; but their main function is to prevent radial movement of the inner portions of the rings with relation to the core, thus confining the movements of the rings with relation to the core mainly to the outer portion. As these duck rings stand edgewise and crosswise of the core, it is practically impossible for the projections on the core to tear or cut the rubber rings D' when those rings are compressed on the core between the end clamps.

In practice I make the rings in varying sizes, all the rings of one size being interchangeable with one another, so that the purchaser may buy extra rings, and thus be enabled to take off any ring which becomes worn or otherwise injured and replace it with a new ring. This is easily done by unskilled workmen, especially if the rings to be applied are first immersed in hot water, which, as has long been well known, softens and enables them to be easily expanded, so that they are readily put in place on the core and then shrink and become a close fit even before they are clamped together on the core, when the slight thinning of each ring by clamping them together causes the constriction of the ring and the gripping of each keyway, as above stated. In order to make the joint between the rings very close—that is, watertight—and making all the rings practically one rubber covering, I prefer to make each ring slightly dished, as clearly shown in Fig. 4, as this causes the clamping-nuts $a'$ to first exert their pressure upon the inner and outer edges of the rings, and on the whole secures a better job in applying the rings to the core, and especially insures a more perfect grip of the interior of the rubber rings upon the keys, thereby making it impossible for liquid to enter between the keys and keyways and also making it certain that the interior of the rings has no motion whatever relatively to the core.

While I have shown the keys and keyways as relatively narrow ribs and grooves, it is obvious that the space between any two keys is, in fact, a wide keyway or groove in the surface of the core and that the space between any two keyways of the rubber is, in fact, a wide key of the rubber.

I am aware of the patent to Clark, No. 179,399, dated July 4, 1876, and disclaim all shown therein, and in particular I do not claim, broadly, a roller composed of sectional rings clamped upon a core with projections and recesses fitting corresponding recesses and projections formed in the sectional rings.

What I claim as my invention is—

1. As a new article of manufacture a vulcanized rubber ring, made up of sheets of textile material alternated with sheets of rubber, disposed edgewise and crosswise of the axis of the ring, but all forming one mass with recesses and projections in its inner portion to fit projections and recesses on the core with which it is to be used.

2. A roll comprising journals projecting from the ends of a core with projections and recesses about its exterior; sectional rings each made up of sheets of fibrous material alternated with sheets of rubber disposed edgewise and crosswise of its axis, but each forming one mass with recesses and projections in its inner portion to fit the projections and recesses about the core; and end clamps to compress the rings in place on the core.

3. A roll comprising journals projecting from the ends of a core with longitudinal ribs disposed radially about its exterior and extending lengthwise in straight lines from end to end of the core; sectional rubber rings each with grooves disposed radially about its interior, and extending lengthwise from end to end of the ring, the grooves of the rubber rings corresponding with the ribs of the core; and end clamps on the core which compress and materially shorten each sectional rubber ring after it is slid in place on the core and thereby cause the rubber rings to constrict the core and grip the keyways, substantially as and for the purposes described.

JAMES BENNETT FORSYTH.

Witnesses:
J. E. MAYNADIER,
RALEIGH B. ADAMS.